A. W. Washburn.
Cotton Planter.
N° 14,629. Patented Mar. 26, 1866.
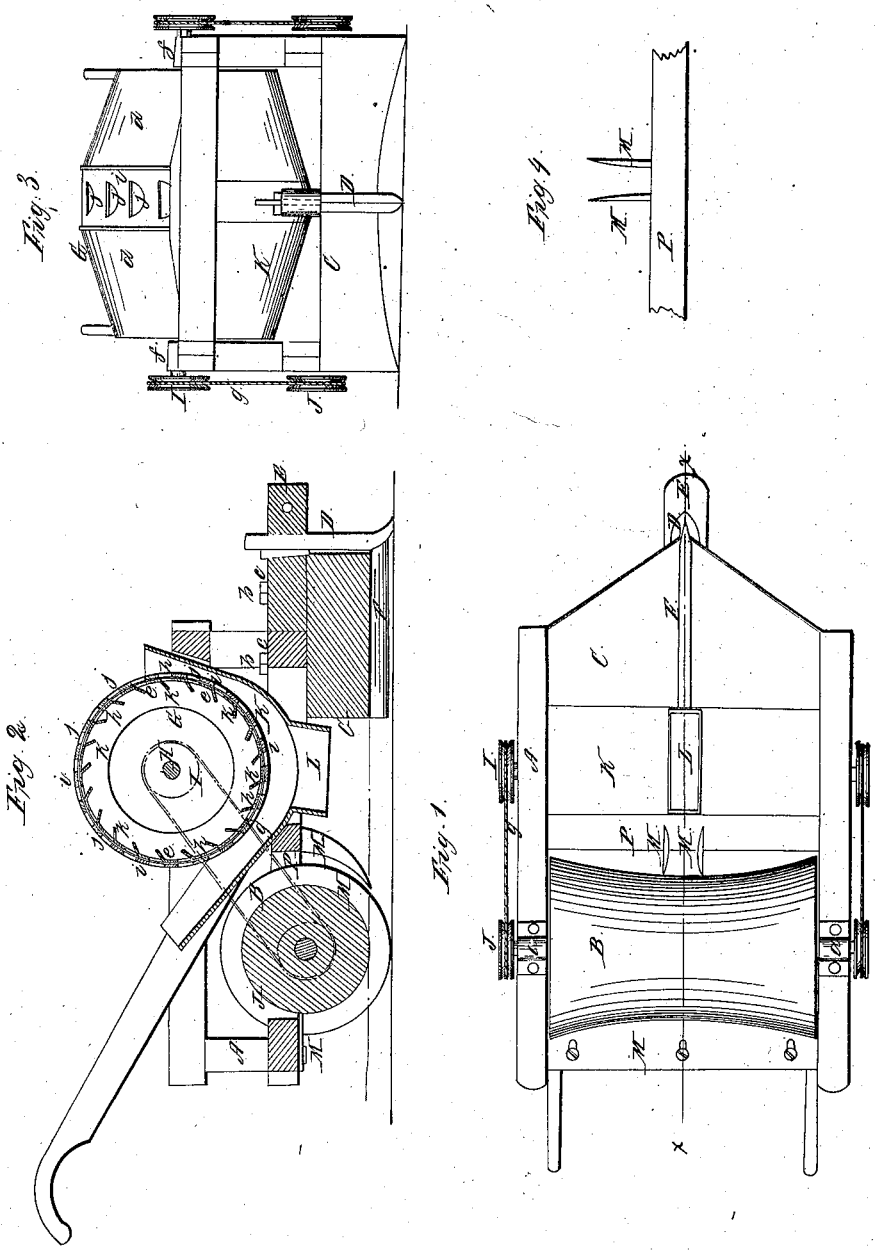

UNITED STATES PATENT OFFICE.

A. W. WASHBURN, OF YAZOO CITY, MISSISSIPPI.

IMPROVEMENT IN COTTON-SEED PLANTERS.

Specification forming part of Letters Patent No. 14,529, dated March 25, 1856.

*To all whom it may concern:*

Be it known that I, A. W. WASHBURN, of Yazoo City, in the county of Yazoo and State of Mississippi, have invented a new and Improved Machine for Planting Cotton-Seed or other Seeds; and I do hereby declare that the following is a full, clear, and exact description thereof, reference being had to the accompanying drawings, making a part of this specification—

Figure 1 being a bottom view of said machine; Fig. 2, a vertical longitudinal section in the line $x\ x$ of Fig. 1; Fig. 3, a view of the forward end of said machine, and Fig. 4 a plan of a detached portion of the same.

Similar letters indicate like parts in all the figures.

To produce healthy and vigorous cotton-plants it is indispensably necessary that the ground should be reduced to perfectly smooth-surfaced ridges, and that the cotton-seed should be deposited in said ridges or swells at a proper and uniform depth below the surface. When thus planted the shoot from each seed will bring to the surface the hull of the seed, and the plants will not be damaged by the washing of the earth upon them by heavy rains, nor will they be injured by standing water. As cotton-seeds are usually planted upon a rough surface, but a small proportion of the plants have a healthy and vigorous start, and many of them wither and die after a few days' exposure.

My improved planter is so constructed that the forward portion of it will form a perfectly smooth rounded ridge with a channel in its apex for the reception of the seeds; and the other portions of said machine are so arranged that they deposit the seeds in said channel, then cover them, and then roll down the ridge to a perfectly smooth rounded surface.

The rectangular frame of my cotton-planter may be constructed in any suitable manner. The forward end of said planter-frame rests upon the concave surface of what I term the "ridge-former" C, and the rear end of said frame rests upon the concave surface of the roller B. The width of the ridge-former C corresponds with the width of the frame of the machine, and in a recess in the longitudinal center of its concave under surface a channel-former, F, is inserted, which is connected to the set-screws $b\ b$, Fig. 2, in such a manner that it can be made to project a greater or a less distance from the under surface of the ridge-former, so that the said channel-former may readily be adjusted to the formation of channels of different depths. The ridge-former C is brought to a blunt point at the center of its front end, and the inclined or curved surfaces of its forward end should rise vertically from its under surface for the purpose of enabling said ridge-former to carry a wave of soil before it to fill up all the holes in the ground and to enable its concave under side to form a perfectly smooth-surfaced channeled ridge when the weight placed upon it corresponds with the nature of the soil operated upon by said implement.

A colter or cultivating-point, D, may be placed immediately in front of the point of the ridge-former with its shank secured in the beam E.

Between the ridge-former C and the roller B of my improved cotton-planter a suitably-shaped hopper, K, is secured to the frame of the machine, and immediately above said hopper a barrel-shaped seed-dropper, G, is suspended on journals projecting from its ends that are received into suitable journal-boxes $f\ f$. The barrel of the seed-dropper G is composed of the central annular portion, $e$, and the conical-shaped portions $d\ d$. The central portion, $e$, of the barrel of the seed-dropper is perforated with planting-apertures $h\ h$, which are generally of a semicircular shape. The curved sides of the apertures $h\ h$ on the top of the seed-dropper are toward the front end of the machine. Flanges $k\ k$ project inward from the straight sides of the apertures $a\ h$ at a considerable angle to the radii of the seed-dropper, as shown in Fig. 2. A perforated movable band, $i$, fits over the central portion, $e$, of the barrel of the seed-dropper. The apertures $j\ j$ in said band correspond in size, number, and location with those in the seed-dropper. The said movable band therefore serves as a gage to regulate the size of the discharging-apertures in the seed-dropper. Motion is imparted to the seed-dropper by means of bands $g\ g$, which connect pulleys on the axle of the roller B with pulleys on the axle of said seed-dropper.

The cross-beam P of the machine, which is situated a short distance in the rear of the discharging-aperture L in the bottom of the hopper K, is armed with two rearwardly-curving and inwardly-beveling covering-spurs, M M, situated in the rear of the sides of the said aperture L in the hopper. The said covering-spurs are curved toward the rear for the purpose of preventing trash from adhering to them as they pass through the soil, and force it inward to cover the seeds and fill up the drill. The accumulation of trash about said spurs during their forward movement would cause the soil to be torn up and the seeds to be scattered after they had been deposited in the ground.

The inclined flanges $k\,k$, which project inward from the after sides of the apertures in the seed-dropper, will produce the following effect when the seed-dropper is rotated, viz: They serve as buckets to carry the seeds upward a short distance, and then cause the rapid forward movement of said dropper to force the seeds out of said apertures at the rear or upward moving side of the seed-dropper. The said flanges also serve to prevent the seeds from falling through the apertures out of the seed-dropper when it is stationary. After the ridge-former C has formed and channeled the ridge and the seeds have been deposited in the channel and said channel has been closed up by the spurs M M, the roller B will reduce the crown of the ridge to a perfectly smooth rounded form.

Having thus fully described my improved cotton-planting machine, what I claim therein as new, and desire to secure by Letters Patent, is—

1. The peculiar shape and arrangement of the ridge-former C and the adjustable channel-former F, by which their forward movement enables them, when suitably loaded, to unerringly form a perfectly smooth channeled ridge, substantially as herein set forth.

2. The combination of the inclined flanges $k\,k$ with the inner periphery of the rotating seed-dropper G, when they are placed in such positions with relation to the discharging-apertures and have such a degree of inclination that the said flanges prevent the seeds from being discharged out of the front or descending side of the said seed-dropper and cause the seeds to be freely discharged through the apertures in the rear or ascending side of said seed-dropper in view of the operator, substantially as herein set forth.

A. W. WASHBURN.

Witnesses:
  WM. E. PUGH,
  LEONARD L. HYATT.